United States Patent Office

3,419,396
Patented Dec. 31, 1968

3,419,396
PRINT-OUT EMULSIONS AND PROCESS
Henri Roger Pierre Chateau, deceased, late of Maisons-Alfort, France, by Jacqueline Chateau, administratrix, Maisons-Alfort, France, and Marie-Claude Marcelle Gadet and Jacques Jean Louis Pouradier, Maisons-Alfort, France, assignors to Eastman Kodak Company, Rochester, N.Y., a corporation of New Jersey
No Drawing. Filed Nov. 4, 1964, Ser. No. 409,008
Claims priority, application France, July 1, 1964, 980,285
4 Claims. (Cl. 96—108)

ABSTRACT OF THE DISCLOSURE

Photographic emulsions comprising cuprous iodide wherein the silver halide of said emulsion consists essentially of silver iodide, and methods for processing said emulsions. In one aspect this emulsion provides a novel print-out emulsion.

---

The present invention relates to silver halide print-out emulsions and methods for processing such emulsions.

Print-out emulsions are well known in the photographic art. Such emulsions, when exposed to an image, print out directly on exposure to form an image in the areas of exposure without further chemical development or subsequent light latensification. Typical print-out materials include silver bromide, silver chloride and silver chlorobromide emulsions. It is known that silver iodide does not normally print out when exposed to light.

It is an object of this invention to provide a novel print-out emulsion.

It is another object of this invention to provide a novel print-out emulsion containing silver iodide.

It is another object of this invention to provide a novel emulsion that is sensitive to the formation of print-out images while wetted with water, but insensitive to the formation of print-out images when substantially dry.

It is still another object of this invention to provide a new print-out emulsion that can be used several times.

It is also an object of this invention to provide a novel photographic emulsion that does not require chemical treatment to give stable images.

It is likewise an object of this invention to provide a novel process for preparing print-out images.

These and other objects of the invention are accomplished with print-out silver iodide emulsions containing cuprous iodide.

When silver iodide-cuprous iodide emulsions are exposed imagewise to light in the presence of water, a print-out image forms in the emulsion layer. On drying, the image is fixed in the emulsion. The subject emulsions are thus sensitive to the formation of print-out images when wetted with water, and substantially insensitive to the formation of print-out images when dry.

The silver halide of the present emulsions consists essentially of silver iodide. The cuprous iodide can be combined with the silver iodide during the precipitation of the silver halide or it can be added to the emulsion after the silver iodide has been prepared. Cuprous iodide is substantially insoluble in water, and hence, we prefer to add the cuprous iodide to the emulsion in the form of a water-soluble complex. The cuprous iodide can be dissolved in an aqueous solution of an alkali metal iodide and hydriodic acid. A typical method for preparing the subject emulsions is to add such a cuprous iodide solution containing an alkali metal iodide to an aqueous gelatin solution, and thereafter add thereto an aqueous solution of a water-soluble silver salt such as silver nitrate. Similarly, the formation of the silver iodide can be effected by simultaneously adding a cuprous iodide and water-soluble iodide solution with a water-soluble silver salt solution. The resulting precipitated silver iodide emulsion is thereafter allowed to ripen at an elevated temperature and the soluble salts thereafter removed. The resulting composition can thereafter further be dispersed in a hydrophilic vehicle such as gelatin prior to coating on a suitable photographic support. The amount of cuprous iodide utilized in preparing such emulsions can be widely varied, suitably at least about .1 mole percent, and more generally about .1 to 50 mole percent, and preferably about 1 to 10 mole percent, of cuprous iodide based on the silver iodide being utilized.

Gold sensitizers can be added to the subject emulsions in the conventional manner. Such sensitizers increase the speed of the emulsions and impart image stability to the print-out image.

Gelatin is preferably utilized as the hydrophilic vehicle or carrier material for the silver iodide and cuprous iodide. However, such materials as polyvinyl alcohol and its water-soluble derivatives and copolymers, water-soluble copolymers such as polyacrylamide, immidized polyacrylamide, etc., and other water-soluble film-forming materials that form water-permeable coatings such as colloidal albumin, water-soluble cellulose derivatives, can be utilized in preparing the present emulsions. Compatible mixtures of two or more of such colloidal materials can be utilized.

The subject emulsions can be coated on a wide variety of supports in accordance with usual practice. Typical suitable supports for the emulsions of the invention include paper, polyethylene-coated paper, glass, cellulose acetate film, polystyrene film, polyethyleneterephthalate film, cellulose nitrate film and the like.

The print-out emulsions of the invention containing silver iodide and cuprous iodide are substantially insensitive to the formation of print-out images when exposed to light when dry or in equilibrium with ambient air moisture. However, when wetted with water, the subject emulsions are sensitive to the formation of print-out images when exposed to light. Thus, the emulsions can be safely handled in the light without light-protecting means, sensitization being readily obtained by wetting with water either before or during exposure to an image. Typically the subject emulsions can be suitably wetted by dipping in water or by spraying with water. The temperature of the emulsion during exposure has an influence on the sensitivity of the emulsion, highest sensitivity being obtained with elevated temperatures. After exposure of the water-imbibed emulsions, the print-out image can be stabilized for substantial periods to ordinary roomlight by drying, such as with hot air. The print-out images can be stored in roomlight for several days before image fading is noticeable. The print-out images can be retained for extended periods of time if stored in the dark.

By subjecting the present emulsions containing a print-out image to a relatively high intensity overall light source, the print-out image fades. After such a fading of the image, the subject emulsions can be wetted with water for resensitization to the formation of print-out images. Thus, the subject emulsions have considerable utility as they can be utilized a plurality of times to photographically record images.

The invention is further illustrated by the following examples of preferred embodiments thereof.

EXAMPLE I

A silver iodide emulsion containing cuprous iodide was prepared and coated as described below. In an emulsion preparation kettle the following materials were combined at 60° C.:

| | Cc. |
|---|---|
| A 4% aqueous phthalic anhydride derivative of gelatin as described in U.S. Patent 2,525,753, e.g., Example 2 | 200 |
| Solution A described below | 100 |
| One mole sodium hydroxide solution | 11 |
| Water | 1500 | pH about 5.0.

Solution A

| | | |
|---|---|---|
| Potassium iodide | g | 100.0 |
| Hydriodic acid (57%) | cc | 2.0 |
| Cuprous iodide | g [1] | 0.3 to 1.6 |

Water to make 100 cc.

[1] Solutions containing various amounts of cuprous iodide were prepared.

A 100 cc. portion of 0.8 molar aqueous silver nitrate solution at about 20° C. was poured into the above gelatin-containing composition to form the silver iodide. Precipitation times of from about 15 to 25 minutes were utilized for various samples. Precipitation was followed by a 15-minute ripening period at 60° C. and the resulting emulsion was deprived of its water-soluble salts by two successive coagulations and redispersions. The last coagulum was dispersed in 100 cc. of water and the pH of the suspension was adjusted to about 6.2. At this stage, the pAg was about 12. A 100 cc. portion of the prepared dispersion was mixed with 200 cc. of a 7% aqueous solution of inert bone gelatin, and thereafter 2 cc. of 15% aqueous saponin solution and 5 cc. of formalin added. The resulting emulsion was coated on baryta paper and dried. Several coatings were made, coverages of silver between 20 and 60 mg. per square decimeter being prepared. The resulting coatings did not print out when dry and were safely handled in roomlight. Sensitization of the coatings was obtained by dipping in water and exposing the wetted emulsions to a projected image with a Kodak Senior II Projector having a 300-watt lamp with a linear magnification of 4. After the image exposure, the emulsions were dried with hot air to stabilize the image. When the exposure was carried out at room temperature (about 20° C.) the exposure time required to obtain a print-out image of high density was about 4 minutes. However, such an exposure time can be reduced to about 20 seconds by making the exposure at an elevated temperature such as at 95° C. The resulting images were dark on a yellow background. The exposure latitudes were sufficient to obtain good halftone renditions. The prints were exposed to roomlight for several days before fading of the image was noticeable. The photographic elements containing the print-out images can be made to fade by exposure to an intense light, and the resulting photographic elements can be utilized again by wetting and exposing to an image. Thus, the subject photographic elements can be utilized several times to photographically record images.

EXAMPLE II

To an emulsion preparation kettle at 60° C. containing 200 cc. of a 4% aqueous phthalic anhydride derivative of gelatin as described in U.S. Patent 2,525,753 (e.g., Example 2) in 1500 cc. of distilled water were simultaneously added 100 cc. of the cuprous iodide and potassium iodide solution described in Example I (Solution A) and 100 cc. of 0.8 molar aqueous silver nitrate solution. The addition speed of the various solutions was adjusted so that the precipitation was carried out over a 15-minute period. One mole molar aqueous sodium hydroxide was added to neutralize the hydriodic acid of Solution A discontinuously at a rate of one cc. for each 10 cc. of Solution A added. The resulting precipitated emulsion or coagulum was thereafter ripened, combined with gelatin, and coated as described in Example I. The coatings were exposed when wet as described in Example I to obtain similar results.

EXAMPLE III

The emulsions described in Examples I and II were utilized without additional sensitization. It has been found that sensitization can be increased by the use of gold salts. The coagulum described in Example II was dispersed in about 100 cc. of water and the pAg of the suspension was adjusted to about 9 by the controlled addition of 0.4 molar aqueous silver nitrate solution thereto. The finishing bone gelatin solution described in Example I was thereafter added. Then the following was added:

| | cc. |
|---|---|
| Sodium thiosulfate pentahydrate (1% solution) | 5 |
| Ammonium sulfocyanate (1% solution) | 5 |
| Potassium aurichloride (1% solution) | 5 |

The resulting emulsion was kept at 40° C. for 20 minutes and thereafter coated as described in Example I. The coating were thereafter wetted and exposed as described in Example I, the gold salt increasing the speed of the emulsion, and changing the print-out image tone and rendering it more stable to light.

EXAMPLE IV

A photographic emulsion was prepared as described in Example I except that 5 cc. of a 1% aqueous solution of potassium aurichloride was utilized in Solution A. The resulting emulsion was coated and exposed as described in Example I. Images having high density were obtained when the photographic elements were wetted by exposing for two minutes at 20° C. or by exposing for 20 seconds at 95° C. as described in Example I.

The invention has been described in detail with particular reference to preferred embodiment thereof, but it will be understood that variations and modifications can be effected within the spirit and scope of the invention as described hereinabove and as defined in the appended claims.

We claim:

1. A print-out silver iodide emulsion in a hydrophilic vehicle containing cuprous iodide.
2. A print-out gelatino-silver iodide emulsion containing cuprous iodide.
3. A print-out gelatino-silver iodide emulsion containing about .1 to 50 mole percent cuprous iodide based on the weight of said silver iodide.
4. The process for preparing print-out images which comprises exposing the emulsion described in claim 1 while wetted with water to light sufficient to produce a visible image.

References Cited

UNITED STATES PATENTS

| 2,910,359 | 10/1959 | Maffet | 96—108 |
| 3,123,474 | 3/1964 | Byrne | 96—119 |
| 3,178,292 | 4/1965 | Fix | 96—108 |

OTHER REFERENCES

F. Moser et al., Optical Absorption Studies of the Volume Photolysis of Large Silver Chloride Crystals, in Physics and Chemistry of Solids, vol. 9, pp. 223–224, 1959.

NORMAN G. TORCHIN, *Primary Examiner.*

R. E. FICHTER, *Assistant Examiner.*